US012800811B2

(12) United States Patent
Seto et al.

(10) Patent No.: US 12,800,811 B2
(45) Date of Patent: Nov. 17, 2026

(54) OPTICAL FILTER AND COVER FOR LiDAR SENSOR

(71) Applicants: AGC Inc., Tokyo (JP); Optical Coatings Japan, Tokyo (JP)

(72) Inventors: Kaname Seto, Tokyo (JP); Masaaki Miyake, Tokyo (JP)

(73) Assignees: AGC Inc., Tokyo (JP); Optical Coatings Japan, Tokyo (JP)

( * ) Notice: Subject to any disclaimer, the term of this patent is extended or adjusted under 35 U.S.C. 154(b) by 274 days.

(21) Appl. No.: 18/505,171

(22) Filed: Nov. 9, 2023

(65) Prior Publication Data

US 2024/0159950 A1 May 16, 2024

(30) Foreign Application Priority Data

Nov. 16, 2022 (JP) ................................ 2022-183582

(51) Int. Cl.
*G02B 5/28* (2006.01)
*G01S 7/481* (2006.01)

(52) U.S. Cl.
CPC .............. *G02B 5/28* (2013.01); *G01S 7/4811* (2013.01)

(58) Field of Classification Search
None
See application file for complete search history.

(56) References Cited

U.S. PATENT DOCUMENTS

| | | | | |
|---|---|---|---|---|
| 2015/0043058 | A1* | 2/2015 | Saito | B32B 27/281 359/359 |
| 2016/0216419 | A1* | 7/2016 | Sprague | C23C 14/3414 |
| 2017/0243988 | A1* | 8/2017 | Bower | H10F 55/255 |
| 2017/0343710 | A1* | 11/2017 | Shiono | G02B 5/208 |
| 2018/0284279 | A1* | 10/2018 | Campbell | G01S 7/4817 |
| 2019/0079339 | A1 | 3/2019 | Fujii | |

FOREIGN PATENT DOCUMENTS

| | | | |
|---|---|---|---|
| EP | 3 085 673 | A1 | 10/2016 |
| JP | H03-187735 | A | 8/1991 |
| JP | 2001-66424 | A | 3/2001 |
| JP | 2001-242318 | A | 9/2001 |
| JP | 2005-266538 | A | 9/2005 |
| JP | 2017068118 | A * | 4/2017 |
| JP | 6881172 | B2 | 6/2021 |
| JP | 2022-535393 | A | 8/2022 |
| WO | WO 2015/093322 | A1 | 6/2015 |
| WO | WO 2022/065000 | A1 | 3/2022 |

* cited by examiner

*Primary Examiner* — Stephone B Allen
*Assistant Examiner* — Tamara Y. Washington
(74) *Attorney, Agent, or Firm* — Oblon, McClelland, Maier & Neustadt, L.L.P.

(57) ABSTRACT

An optical filter includes: a substrate; a dielectric multilayer film laid on or above at least one major surface of the substrate; and a protective layer laid on or above the dielectric multilayer film, in which the dielectric multilayer film includes a layer made of amorphous silicon and a layer differing in refractive index from the layer made of amorphous silicon, the protective layer includes a mixed film, and the mixed film includes silica, and an oxide of at least one metal selected from among tantalum, niobium, zirconium, titanium, hafnium, tungsten, tin, cerium, chromium, nickel, and vanadium.

5 Claims, 1 Drawing Sheet

OPTICAL FILTER AND COVER FOR LiDAR SENSOR

CROSS-REFERENCE TO RELATED APPLICATIONS

This application claims priority from Japanese Patent Application No. 2022-183582 filed on Nov. 16, 2022, the entire subject matter of which is incorporated herein by reference.

TECHNICAL FIELD

The present invention relates to an optical filter which blocks visible-region light and transmits near-infrared-region light, and to a cover for LiDAR sensor including the optical filter.

BACKGROUND ART

A sensor module, e.g., a light detection and ranging (LiDAR) device, which irradiates an object of interest with near-infrared laser light and detects the light returning after reflection by the object is equipped with a cover for protecting both the laser light source and the sensor. In the cover, use is made of an optical filter which transmits near infrared light having wavelengths of 800 nm and longer and blocks visible light, which can cause disturbance, in order to heighten the sensitivity of the sensor.

Patent Document 1 describes an antireflection-film-coated transparent base which includes a transparent base and an antireflection film of a multilayer structure including high-refractive-index films and low-refractive-index films and which is suitable for use as the cover of a vehicle-mounted display device including a near infrared light sensor.

Patent Document 1: Japanese Patent No. 6881172

SUMMARY OF INVENTION

Optical filters for use as sensor module covers are required to have not only excellent spectral characteristics, such as the property of transmitting near infrared light and the property of blocking visible light, but also a black color for enhancing appearance attractiveness, even when the light enters the optical filters at large incident angles.

Furthermore, the sensor module covers, especially ones for on-vehicle use, are supposed to be exposed to outdoor environments involving seawater, snow melting agents, etc., and the optical filters used as the covers are required to have high resistance to corrosion by salt water besides the spectral characteristics.

An object of the present invention is to provide an optical filter excellent in terms of spectral characteristic, appearance attractiveness, and resistance to corrosion by salt water.

The present invention provides an optical filter having the following configuration.

An optical filter including:

a substrate;

a dielectric multilayer film laid on or above at least one major surface of the substrate; and a protective layer laid on or above the dielectric multilayer film, wherein the dielectric multilayer film includes a layer made of amorphous silicon and a layer differing in refractive index from the layer made of amorphous silicon, the protective layer includes a mixed film, and the mixed film includes silica, and an oxide of at least one metal selected from among tantalum, niobium, zirconium, titanium, hafnium, tungsten, tin, cerium, chromium, nickel, and vanadium.

The present invention can provide: an optical filter which is excellent in terms of the property of transmitting near infrared light and the property of blocking visible light, is black in appearance, and has excellent resistance to corrosion by salt water; and a cover for a LiDAR sensor including the optical filter.

DESCRIPTION OF EMBODIMENTS

In this specification, for example, the expression "having a transmittance of 90% or higher" in a specific wavelength range means that the transmittance is not below 90% throughout the wavelength range, that is, the minimum transmittance within that wavelength range is 90% or higher. Likewise, for example, the expression "having a transmittance of 1% or less" in a specific wavelength range means that the transmittance does not exceed 1% throughout the wavelength range, that is, the maximum transmittance within that wavelength range is 1% or less. An average transmittance in a specific wavelength range is an arithmetic average of transmittance values measured every 1 nm in wavelength in the wavelength range.

Unless otherwise indicated, values of refractive index are ones measured at 20° C. using light having a wavelength of 550 nm.

Spectral characteristics can be determined using a spectrophotometer, or can be calculated by a simulation with an optical thin film calculation software.

With respect to the spectral characteristics, in the case where there is no particular mention of incident angle, this means that the incident angle is 0 degrees (perpendicular to the major surface of the optical filter).

In this specification, the symbol "-" or the word "to" that is used to express a numerical range includes the numerical values before and after the symbol or the word as the upper limit and the lower limit of the range, respectively.

In this specification, the color index is L*a*b*based on JIS Z 8781-4: 2013.

<Optical Filter>

The optical filter of the present invention (hereinafter referred to also as "present filter") includes a substrate, a dielectric multilayer film laid on or above at least one major surface of the substrate, and a protective layer laid on or above the dielectric multilayer film.

Figure 1:
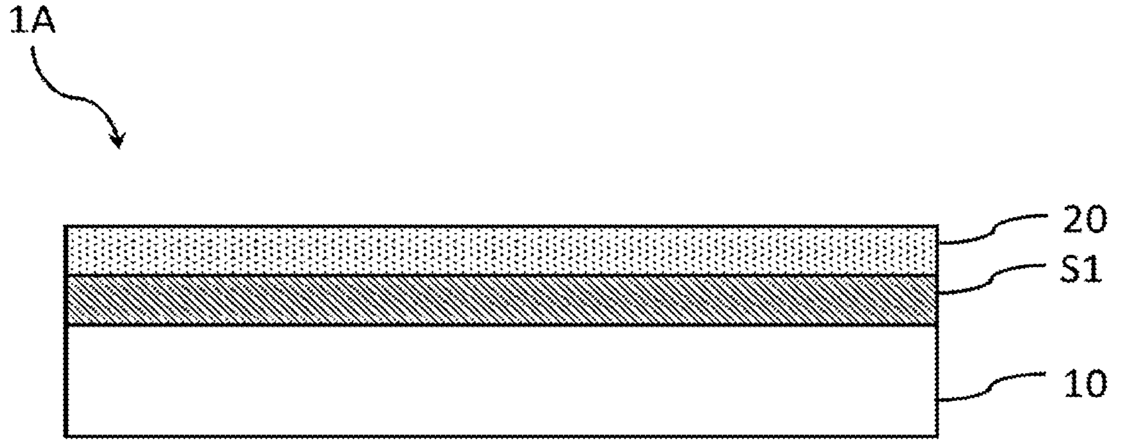
FIG. 1 is a cross-sectional view diagrammatically illustrating an example of an optical filter in one embodiment.

Examples of a configuration of the present filter will be described with reference to the drawings. FIG. 1 is a cross-sectional view diagrammatically illustrating an example of an optical filter in an embodiment.

The optical filter 1A illustrated in FIG. 1 is an example which has a dielectric multilayer film S1 on one major surface of a substrate 10 and further has a protective layer 20 on the dielectric multilayer film S1. The expression "having a particular layer on or above a major surface of a substrate" is not limited to a case that the particular layer is in contact with the major surface of the substrate but includes a case that another function layer is provided between the substrate and the particular layer.

Figure 2:
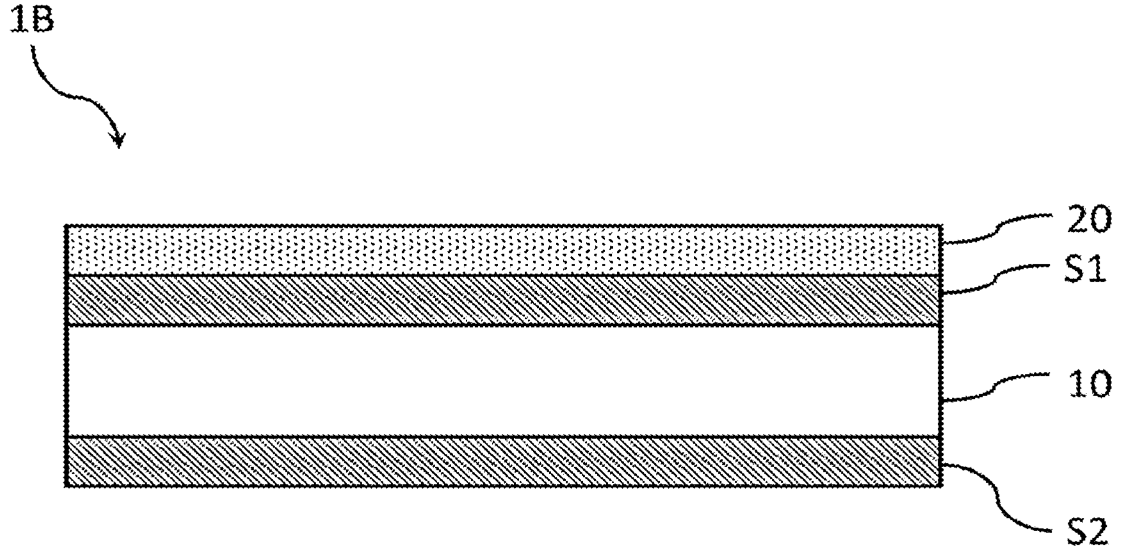
FIG. 2 is a cross-sectional view diagrammatically illustrating an example of an optical filter in one embodiment.

The optical filter 1B illustrated in FIG. 2 is an example which has a dielectric multilayer film S1 on one major surface of a substrate 10, has a dielectric multilayer film S2 on the other major surface, and has a protective layer 20 on the dielectric multilayer film S1.

<Substrate>

The substrate in the present filter may have either a single-layer structure or a multilayer structure. The material of the substrate is not particularly limited so long as it is a transparent material which transmits near infrared light, and may be an organic material or an inorganic material. A plurality of different materials may be combined and used.

Preferable transparent inorganic materials include glass and a crystal material.

Examples of the glasses include a soda-lime glass, a borosilicate glass, an alkali-free glasses, a quartz glass, and an aluminosilicate glass.

The glass may be a chemically strengthened glass obtained by replacing alkali metal ions existing adjacent to a major surface of a glass plate and having a small ion diameter (e.g., Li ions or Na ions) with alkali metal ions having a larger ion diameter (e.g., Na ions or K ions for Li ions or K ions for Na ions) by ion exchange at a glass transition temperature or lower.

Examples of the crystal materials include birefringent crystals such as quartz, lithium niobate, and sapphire.

The substrate is not particularly limited in its shape, and may have a block, plate, or film shape.

From the standpoints of reduction in warpage when a dielectric multilayer film is formed, height reduction and suppression of braking of the optical filter, it is preferable that the thickness of the substrate be 0.1 mm to 5 mm, even preferably 2 mm to 4 mm.

<Dielectric Multilayer Film>

The dielectric multilayer film laid on or above at least one major surface of the substrate is designed so that at least one of the dielectric multilayer films has wavelength selectivity. In the present invention, this dielectric multilayer film is a layer which blocks visible light and transmits near infrared light (hereinafter referred to also as "visible-light-blocking layer"). In the case where the dielectric multilayer film is laid on or above both surfaces of the substrate, both of the dielectric multilayer films may be visible-light-blocking layers or only one of these may be a layer transmitting near infrared light. In the case where one of the dielectric multilayer films is a visible-light-blocking layer, the other may be designed as a layer for another purpose, e.g., an antireflection layer.

The dielectric multilayer film which is a layer that blocks visible light and transmits near infrared light will be explained.

At least one of the dielectric multilayer films includes one or more layers (hereinafter referred to also as "a-Si layer(s)") made of amorphous silicon and one or more layers (hereinafter referred to also as "other dielectric layer(s)") differing in refractive index from the one or more layers made of amorphous silicon. By laying thin films differing in refractive index, light interference can be utilized to increase or reduce reflectance.

Amorphous silicon has the ability to absorb visible light. Hence, the dielectric multilayer film including a-Si layer(s) gives an optical filter having excellent visible-light-blocking characteristics. In addition, in the case where visible light can be blocked by absorption, there is no need of blocking visible light by reflection, making it possible to design the dielectric multilayer film so as to have a reduced visible-light reflectance. As a result, an optical filter which is low in both visible-light transmittance and reflectance, that is, which has a black color, is obtained. Even when the number of laid layers in the dielectric multilayer film and the thickness of each dielectric layer are small, it is possible to sufficiently block the light in the visible region and, hence, a reduction in the overall thickness of the optical filter can be attained.

The amorphous silicon is preferably one not doped with hydrogen, and has a spin density, which can be determined with an electron spin resonance device, of preferably 5.0E+10 or higher (number/(nm*cm$^2$)) and an extinction coefficient $k_{600}$ at a wavelength of 600 nm of preferably 0.12 or higher.

The amorphous silicon has a refractive index at a wavelength of 550 nm of 4.75. The other dielectric layer(s) are not limited so long as the layer(s) have a refractive index different from that index.

Examples of the material of the other dielectric layer(s) include $Ta_2O_5$ (refractive index, 2.15), $Nb_2O_5$ (refractive index, 2.35), $TiO_2$ (refractive index, 2.45), $ZrO_2$ (refractive index, 2.12), $HfO_2$ (refractive index, 2.14), SiO (refractive index, 2.01), $Al_2O_3$ (refractive index, 1.61), $SiO_2$ (refractive index, 1.48), $SiO_xN_y$ refractive index, 1.72), and SiN (refractive index, 2.00); one or more of these can be used. Among those, the other dielectric layer(s) preferably at least include $SiO_2$ from the standpoint of lowering the reflectance in the near-infrared region by the large difference in refractive index between $SiO_2$ and amorphous silicon and from the standpoints of the color of reflected light in the visible-light region and of production efficiency. Meanwhile, from the standpoint of making it possible to design a satisfactory film which is highly effective in inhibiting the dielectric multilayer film from increasing in reflectance for near-infrared-region light having large incident angles and from the standpoint of the high reproducibility of optical constants, the other dielectric layer(s) preferably include at least one of $Nb_2O_5$ and $Ta_2O_5$.

The total number of laid layers in the dielectric multilayer film can be set in view of reducing the reflectance in the visible-light region, of inhibiting the reflectance in the near-infrared-light region from increasing when light enters at large incident angles, and of reducing the transmittance in the visible-light region, and is preferably 25 to 60, more preferably 28 to 50.

The total number of laid a-Si layer(s) in the dielectric multilayer film is preferably 7 to 19, more preferably 9 to 16, from the standpoint of reducing the transmittance in the visible-light region.

The thickness of the dielectric multilayer film is preferably 1.2 μm to 5.0 μm, more preferably 1.8 μm to 2.9 μm, from the standpoints of reducing the reflectance in the visible-light region, of reducing the transmittance in the visible-light region, and of preventing the production efficiency from decreasing due to a layer change and preventing film thickness control from decreasing due to multilayer arrangement.

In the dielectric multilayer film, the thickness of each a-Si layer is preferably 1 nm to 300 nm. From the standpoint of reducing the visible-light-reflecting characteristics (improving the visible-light-absorbing characteristics), it is advantageous to increase the thickness of each a-Si layer, which is absorptive. However, since light-absorbing characteristics are generally continuous, there is a possibility that the ability to absorb not only visible light but also near infrared light might be wholly improved undesirably and this might result in a decrease in transmission in the near-infrared region. In the case where the thickness of each a-Si layer is within that range, it is possible to attain both visible-light blocking characteristics and the property of highly transmitting near infrared light even when the light enters at large incident angles.

For forming the dielectric multilayer film, use can be made of a dry film deposition process such as CVD, sputtering, or vacuum deposition, or a wet film deposition process such as spraying or dipping.

Also in the case where the dielectric multilayer film is designed as an antireflection layer, this film is obtained by laying dielectric layers differing in refractive index like the visible-light-blocking layer. Besides being the dielectric multilayer film, the antireflection layer may include a medium having an intermediate refractive index, a moth eye structure in which the refractive index changes gradually, etc.

<Protective Layer>

In the present filter, the protective layer is disposed in order to protect the dielectric multilayer film against outdoor environments to enhance the durability of the optical filter.

The protective layer desirably includes a metal oxide which can enhance the resistance of the optical filter to corrosion by salt water and which has a higher binding energy than that of $SiO_2$. Specifically, the protective layer includes a mixed film. The mixed film includes silica, and an oxide of at least one metal selected from among tantalum, niobium, zirconium, titanium, hafnium, tungsten, tin, cerium, chromium, nickel, vanadium, lanthanoid-based elements, scandium, yttrium, zinc, aluminum, and magnesium. In the case where durability other than resistance to corrosion by salt water and cost are taken into account, the mixed film preferably includes silica, and an oxide of at least one metal selected from among tantalum, niobium, zirconium, titanium, hafnium, tungsten, tin, cerium, chromium, nickel, and vanadium. The inclusion of such metal oxide in the protective layer can especially enhance the resistance of the optical filter to corrosion by salt water. In the case where the metal oxide is included, sufficient durability can be achieved even when the metal oxide is disposed as a plurality of layers or in a reduced thickness to such a degree that the disposition does not adversely affect the spectral characteristics of the optical filter. Note that the term “metal oxide” or “oxide of metal” herein can mean a composite metal oxide including two or more of those metals. Furthermore, the protective layer may include two or more metal oxides differing in the kind of metal.

As described above, the protective layer includes silica ($SiO_2$) together with the metal oxide. The metal oxide is preferably niobium oxide.

Oxides of the non-niobium metals, among the metals described above, are excellent in terms of alkali resistance as well as resistance to corrosion by salt water. In the case of using niobium, the alkali resistance can be heightened by the inclusion of $SiO_2$ (silica) together with niobium oxide.

In the case where the protective layer includes a metal oxide and silica, the refractive index at a wavelength of 550 nm of this protective layer is preferably 1.49 or higher and 2.20 or less. That range of the refractive index of the protective layer is preferred because this protective layer enables the optical filter to have satisfactory spectral characteristics. The refractive index of the protective layer can be controlled by regulating the proportion of the metal oxide to the silica.

In the case where the protective layer includes niobium oxide and silica, the refractive index at a wavelength of 550 nm of this protective layer is preferably 1.49 or higher and 2.20 or less. That range of the refractive index of the protective layer is preferred because this protective layer enables the optical filter to have satisfactory spectral characteristics.

In the case where the protective layer includes a metal oxide and silica, a proportion represented by $(M1/(M1+M2))\times100$ is preferably 2.0% or higher, more preferably 5.0% or higher, where, in the protective layer, M1 is the number of atoms of the metal, and M2 is the number of atoms of silicon. That range of the proportion of the number of atoms between the metal and silicon is preferred because this protective layer is excellent in terms of both resistance to corrosion by salt water and alkali resistance.

In the case where the protective layer includes niobium oxide and silica, a proportion represented by proportion $(M1_{Nb}/(M1_{Nb}+M2))\times100$ is preferably 4.0% to 45.0%, more preferably 8.0% to 35.0%, where, in the protective layer, $M1_{Nb}$ is the number of atoms of niobium, and M2 is the number of atoms of silicon. That range of the proportion of the number of atoms between niobium and silicon is preferred because this protective layer has a refractive index within the preferred range and has sufficient alkali resistance.

The protective layer has a thickness of preferably 5 nm or larger, more preferably 20 nm or larger. In the case where the thickness of the protective layer is within that range, this protective layer can cover the underlying dielectric multilayer film with satisfactory coverage to attain sufficient durability. The thickness of the protective layer is preferably 500 nm or less, more preferably 300 nm or less. However, since the optical characteristics are affected also by refractive index, the refractive index of the protective layer which has a small thickness of 50 nm or less is preferably 2.20 or less and the refractive index of the protective layer which has a thickness of 50 nm or larger is preferably 1.95 or less. In the case where the refractive index of the protective layer is within that range, the optical filter retains satisfactory spectral characteristics.

The protective layer may consist of a single layer or may include a plurality of layers or may be a gradient film in which the mixing ratio changes gradually. Even when the protective layer includes a plurality of layers, the protective layer preferably has an overall thickness within that preferred range.

For forming the protective layer, use can be made of a dry film deposition process such as CVD, sputtering, or vacuum deposition, or a wet film deposition process such as spraying or dipping.

In the case where two or more metals are used as materials for forming the protective layer or in the case where one or more metals and silicon are used as materials for forming the protective layer, the starting-material metals and silicon can be simultaneously subjected to film deposition.

<Spectral Characteristics>

The optical filter of the present invention, which has the configuration described above, preferably satisfies all of the following spectral characteristics (i-1) to (i-4):

(i-1) a minimum reflectance $R_{800\text{-}1600(5)MIN}$ is 1.0% or less at an incident angle of 5 degrees within a wavelength range of 800 nm to 1,600 nm;

(i-2) a minimum reflectance $R_{800\text{-}1600(60)MIN}$ is 3.5% or less at an incident angle of 60 degrees within the wavelength range of 800 nm to 1,600 nm;

(i-3) an average transmittance $T_{400\text{-}680(0)AVE}$ is 5.0% or less at an incident angle of 0 degrees within a wavelength range of 400 nm to 680 nm; and (i-4) a surface of the protective layer has a color satisfying $-10 \le a^* \le +10$ and $-10 \le b^* \le +10$ in an incident angle of 0 degrees to 60 degrees under D65 light source.

It is obtained that by satisfying spectral the characteristics (i-1) and (i-2), an optical filter has a low reflectance in the near-infrared-light region even at large incident angles.

It is obtained that by satisfying spectral the characteristic (i-3), an optical filter has excellent visible-light-blocking characteristics.

It is obtained that by satisfying spectral the characteristic (i-4), an optical filter has a black color in a wide incident angle range.

The optical filter of the present invention preferably further satisfies the following spectral characteristic (i-5):

(i-5) a maximum transmittance $T_{800\text{-}1600(0)MAX}$ is 90% or higher at an incident angle of 0 degrees within the wavelength range of 800 nm to 1,600 nm.

The optical filter of the present invention preferably further satisfies the following spectral characteristic (i-6):

(i-6) a surface of the protective layer has a color that $\Delta a^* \times \Delta b^*$ is preferably 0 to 100, more preferably 0 to 40, in an incident angle of 0 degrees to 60 degrees under D65 light source.

The smaller the $\Delta a^* \times \Delta b^*$ is, the smaller the change in color is, which is preferred. It is obtained that by satisfying spectral characteristic (i-6), an optical filter has a black color and changes little in color throughout a wide incident angle range.

<Cover for LiDAR Sensor>

The cover for a LiDAR sensor of the present invention includes the optical filter of the present invention in one embodiment. This makes it possible to obtain a sensor excellent in terms of sensitivity, appearance, and durability.

When the cover for a LiDAR sensor of the present invention is mounted on a sensor module, it is preferred to dispose the cover so that the protective layer lies on the outer side (on the side opposite from the sensor).

As described above, this specification discloses the following optical filter, etc.

(1) An optical filter including:
- a substrate;
- a dielectric multilayer film laid on or above at least one major surface of the substrate; and
- a protective layer laid on or above the dielectric multilayer film, in which
- the dielectric multilayer film includes a layer made of amorphous silicon and a layer differing in refractive index from the layer made of amorphous silicon,
- the protective layer includes a mixed film, and
- the mixed film includes silica, and an oxide of at least one metal selected from among tantalum, niobium, zirconium, titanium, hafnium, tungsten, tin, cerium, chromium, nickel, and vanadium.

(2) The optical filter according to (1), in which the protective layer comprises niobium oxide and silica, and
- the protective layer has a refractive index at a wavelength of 550 nm of 1.49 to 2.20.

(3) The optical filter according to claim (1), in which, in the protective layer, a proportion represented by $(M1/(M1+M2))\times 100$ is 2.0% or higher,
- M1 is the number of atoms of the at least one metal selected from among tantalum, niobium, zirconium, titanium, hafnium, tungsten, tin, cerium, chromium, nickel, and vanadium, and
- M2 is the number of atoms of silicon.

(4) The optical filter according to (2) or (3), in which, in the protective layer, a proportion represented by $(M1_{N}b/(M1_{N}b+M2))\times 100$ is 4.0% to 45.0%,
- $M1N_b$ is the number of atoms of niobium, and
- M2 is the number of atoms of silicon.

(5) The optical filter according to according to any one of (1) to (4), satisfying all of the following spectral characteristics (i-1) to (i-4):
- (i-1) a minimum reflectance $R_{800\text{-}1600(5)MIN}$ is 1.0% or less at an incident angle of 5 degrees within a wavelength range of 800 nm to 1,600 nm;
- (i-2) a minimum reflectance $R_{800\text{-}1600(60)MIN}$ is 3.5% or less at an incident angle of 60 degrees within the wavelength range of 800 nm to 1,600 nm;
- (i-3) an average transmittance $T_{400\text{-}680(0)AVE}$ is 5.0% or less at an incident angle of 0 degrees within a wavelength range of 400 nm to 680 nm; and
- (i-4) a surface of the protective layer has a color satisfying $-10 \le a^* \le +10$ and $-10 \le b^* \le +10$ in an incident angle of 0 degrees to 60 degrees under D65 light source.

(6) A cover for a LiDAR sensor, including the optical filter according to any one of (1) to (5).

EXAMPLES

The present invention will be explained in greater detail below using Examples.

Spectral characteristics were calculated by a simulation with an optical thin film calculation software.

With respect to the spectral characteristics, in the case where there is no particular mention of incident angle, the values are ones measured at 0 degrees (the direction perpendicular to the major surface of the optical filter).

As a transparent glass substrate, an aluminosilicate glass plate having a thickness of 2 mm was used.

The refractive index of each protective layer was calculated using a spectrum obtained with a spectrophotometer.

As materials for dielectric multilayer films, a-Si (amorphous silicon not doped with hydrogen) (refractive index, 4.75), $SiO_2$ (refractive index, 1,48), $Nb_2O_5$ (refractive index, 2.35), and $Ta_2O_5$ (refractive index, 2.15) were used.

Example 1-1 to Example 1-17

On one major surface of a transparent glass substrate, $Ta_2O_5$ was deposited so as to result in a film thickness of 200 nm by sputtering using Ar and $O_2$ gases. Furthermore, using material M1 alone or using materials M1 and M2, which are shown in Table 1, as protective-layer materials, oxide films having a thickness of 200 nm were formed as protective layers so that the oxide films each had a composition corresponding to the proportion shown in Table 1. Incidentally, the $Ta_2O_5$ film was disposed as an underlying film in order to make it easy to visually distinguish each protective layer. The oxide films as protective layers were formed using alloy targets and co-sputtering. In each Example where metal was used as material M1 and Si was used as material M2, the protective layer was formed as a mixed film including at least one metal oxide and silica.

In Example 1-17, an $SiO_2$ film not including material M1 was formed as a surface layer and no protective layer was formed.

<Salt-Water Corrosion Resistance Test>

Using a micropipette, 10 μL of 5 mass % aqueous NaCl solution was dropped onto the film surface of each produced sample. This sample was stored in a thermo-hygrostatic chamber of 65° C. and 95%, and the time period required for the sample to discolor (corrode) was measured.

In the case where the time period was 10 hours or longer, the sample was regarded as having excellent resistance to corrosion by salt water.

<Alkali Resistance Test>

A beaker containing 500 mL of 5 mass % aqueous NaOH solution was prepared and the aqueous NaOH solution was heated to 30° C. with a heater. Thereafter, each produced sample was immersed in the aqueous NaOH solution and taken out after 40 minutes. Spectra of the sample were obtained before and after the immersion in the aqueous NaOH solution, and each film thickness was calculated from the spectra. Dissolution rates of the protective layers shown in Table 1 and of the $SiO_2$ film of Example 1-17 were calculated.

In the case where the dissolution rate was 0.5 nm/min or less, the sample was regarded as having excellent alkali resistance.

The results of the evaluation are shown in the following Table 1.

Example 1-1 to Example 1-16 are reference examples and Example 1-17 is a comparative reference example.

Meanwhile, the optical filter of Example 1-17, which has substantially no protective layer having the given composition, was insufficient in both salt-water corrosion resistance and alkali resistance.

Although Table 1 shows evaluation results for samples which each included a $Ta_2O_5$ film disposed under the protective layer, it was ascertained that configurations obtained by disposing the protective layers shown in Table 1 on a multilayer film composed of laid a-Si films and $SiO_2$ films showed a similar tendency regarding salt-water corrosion resistance and alkali resistance.

Example 2-1

Layers of a-Si, $SiO_2$, and $Nb_2O_5$ were deposited on one major surface of a transparent glass substrate by sputtering to form a dielectric multilayer film (S1) in which the total number of laid layers was 13 and which had an overall film thickness of 0.7 m. Layers of a-Si, $SiO_2$, and $Nb_2O_5$ were deposited on the other major surface of the transparent glass substrate by sputtering to form a dielectric multilayer film (S2) in which the total number of laid layers was 17 and which had an overall film thickness of 1.2 km.

On the surface of the dielectric multilayer film (S1), Si and Nb were simultaneously vapor-deposited by co-sputtering to form a protective layer including an oxide of Si and Nb and having the refractive index shown in Table 2.

TABLE 1

| | Protective layer | | | | | | Salt-water corrosion resistance test | Alkali resistance test |
|---|---|---|---|---|---|---|---|---|
| | Kind | Material M1 | Material M2 | Proportion of number of atoms (%) M1/(M1 + M2) × 100 | Refractive index (at 550 nm) | Thickness (nm) | Time period required for discoloration (h) | Dissolution rate (nm/min) |
| Ex. 1-1 | $SiO_2 + ZrO_2$ | Zr | Si | 5 | 1.54 | 100 | 96 | 0.1 |
| Ex. 1-2 | | Zr | Si | 10 | 1.55 | 100 | 96 | 0.0 |
| Ex. 1-3 | | Zr | Si | 20 | 1.58 | 100 | >147 | 0.0 |
| Ex. 1-4 | $ZrO_2$ | Zr | — | 100 | 2.12 | 100 | >147 | 0.0 |
| Ex. 1-5 | $SiO_2 + Nb_2O_5$ | Nb | Si | 2.0 | 1.49 | 100 | 12 | 0.9 |
| Ex. 1-6 | | Nb | Si | 8.8 | 1.54 | 100 | 96 | 0.2 |
| Ex. 1-7 | | Nb | Si | 23.6 | 1.65 | 100 | >147 | 0.2 |
| Ex. 1-8 | | Nb | Si | 37.8 | 1.80 | 100 | >147 | 0.3 |
| Ex. 1-9 | | Nb | Si | 65.3 | 2.04 | 100 | >147 | 0.8 |
| Ex. 1-10 | $Nb_2O_5$ | Nb | — | 100 | 2.35 | 100 | >147 | 1.7 |
| Ex. 1-11 | $SiO_2 + Ta_2O_5$ | Ta | Si | 3.6 | 1.49 | 100 | 147 | 0.1 |
| Ex. 1-12 | | Ta | Si | 16.0 | 1.56 | 100 | >147 | 0.0 |
| Ex. 1-13 | | Ta | Si | 34.0 | 1.68 | 100 | >147 | 0.0 |
| Ex. 1-14 | | Ta | Si | 36.3 | 1.71 | 100 | >147 | 0.0 |
| Ex. 1-15 | | Ta | Si | 80.3 | 2.01 | 100 | >147 | 0.0 |
| Ex. 1-16 | $Ta_2O_5$ | Ta | — | 100 | 2.15 | 100 | >147 | 0.0 |
| Ex. 1-17 | no protective layer ($SiO_2$) | — | Si | 0.0 | 1.48 | 100 | 3 | 0.8 |

It can be seen from the results of Examples 1-1 to 1-16 that by providing protective layers including an oxide of Zr, Ta, or Nb as outermost layers, optical filters having excellent salt-water corrosion resistance are obtained. From the results of Examples 1-1 to 1-4 and Examples 1-11 to 1-16, it can be seen that in the case where the protective layers include an oxide of Zr or Ta, optical filters having excellent alkali resistance are obtained. From the results of Examples 1-5 to 1-10, it can be seen that in the case where the protective layers include a Nb oxide, optical filters having excellent alkali resistance are obtained such that the protective layers further contain silica to regulate the proportion of the number of atoms.

Thus, an optical filter of Example 2-1 was obtained.

Example 2-2 to Example 2-14

Optical filters of Example 2-2 to Example 2-14 were produced under the same conditions as in Example 2-1, except that the proportion of Si to Nb was regulated so as to make the protective layers have the refractive index values shown in Table 2 and that the protective layers were formed so as to have the thickness values shown in Table 2.

The spectral characteristics are shown in the following Table 2.

Example 2-1 to Example 2-14 are inventive examples according to the present invention.

TABLE 2

| | Protective layer: $SiO_2 + Nb_2O_5$ | | S1-side minimum reflectance | S1-side minimum reflectance |
|---|---|---|---|---|
| | Refractive index (550 nm) | Thickness (nm) | R800-1600 nm, 5 degrees, MIN (%) | R800-1600 nm, 60 degrees, MIN (%) |
| Ex. 2-1 | 1.54 | 30 | 0.01 | 1.77 |
| Ex. 2-2 | 1.65 | 30 | 0.00 | 1.87 |
| Ex. 2-3 | 1.80 | 30 | 0.00 | 1.98 |
| Ex. 2-4 | 2.04 | 30 | 0.01 | 2.27 |
| Ex. 2-5 | 2.35 | 30 | 0.05 | 2.80 |
| Ex. 2-6 | 1.54 | 80 | 0.00 | 1.86 |
| Ex. 2-7 | 1.65 | 80 | 0.00 | 2.10 |
| Ex. 2-8 | 1.80 | 80 | 0.03 | 2.75 |
| Ex. 2-9 | 2.04 | 80 | 0.12 | 4.38 |
| Ex. 2-10 | 1.54 | 121 | 0.00 | 1.94 |
| Ex. 2-11 | 1.65 | 113 | 0.01 | 2.26 |
| Ex. 2-12 | 1.80 | 101 | 0.05 | 3.15 |
| Ex. 2-13 | 2.04 | 92 | 0.12 | 4.88 |
| Ex. 2-14 | 2.35 | 101 | 0.11 | 4.14 |

| | a* (incident angle, 0-60 degrees) | b* (incident angle, 0-60 degrees) | Δa* × Δb* | Average transmittance T400-680 nm, 0 degrees, AVE (%) |
|---|---|---|---|---|
| Ex. 2-1 | −4.27 ≤ a* ≤ 0.2 | −1.64 ≤ b* ≤ 1.05 | 12.0 | 2.0 |
| Ex. 2-2 | −4.71 ≤ a* ≤ 0.21 | −1.48 ≤ b* ≤ 1.18 | 13.1 | 2.0 |
| Ex. 2-3 | −4.9 ≤ a* ≤ −0.18 | −0.98 ≤ b* ≤ 1.06 | 9.6 | 2.0 |
| Ex. 2-4 | −4.19 ≤ a* ≤ −1.02 | −0.98 ≤ b* ≤ 0.34 | 4.2 | 2.0 |
| Ex. 2-5 | −3.36 ≤ a* ≤ −0.58 | −1.07 ≤ b* ≤ 0.36 | 4.0 | 2.0 |
| Ex. 2-6 | −4.81 ≤ a* ≤ 0.07 | −1.41 ≤ b* ≤ 1.23 | 12.9 | 2.0 |
| Ex. 2-7 | −4.27 ≤ a* ≤ −0.42 | −1.03 ≤ b* ≤ 0.85 | 7.2 | 2.1 |
| Ex. 2-8 | −3.13 ≤ a* ≤ −0.83 | −1.18 ≤ b* ≤ −0.17 | 2.3 | 2.0 |
| Ex. 2-9 | −3.03 ≤ a* ≤ 0.08 | −1.11 ≤ b* ≤ −0.45 | 2.1 | 1.9 |
| Ex. 2-10 | −4.57 ≤ a* ≤ −0.08 | −1.27 ≤ b* ≤ 1.06 | 10.5 | 2.1 |
| Ex. 2-11 | −3.89 ≤ a* ≤ −0.66 | −0.97 ≤ b* ≤ 0.53 | 4.8 | 2.1 |
| Ex. 2-12 | −2.96 ≤ a* ≤ −0.76 | −1.24 ≤ b* ≤ −0.07 | 2.6 | 2.1 |
| Ex. 2-13 | −3.84 ≤ a* ≤ −0.15 | −1.13 ≤ b* ≤ 0.06 | 4.4 | 2.0 |
| Ex. 2-14 | −0.27 ≤ a* ≤ 0.61 | −2.23 ≤ b* ≤ −0.19 | 1.8 | 1.4 |

The results given in Table 2 show that optical filters having excellent spectral characteristics were obtained. It can be further seen that since a* and b* were within the range of −10 to +10, the obtained optical filters had excellent appearance attractiveness. In Examples 2-9, 2-13, and 2-14, the minimum reflectances at an incident angle of 60° within the wavelength range of 800 to 1,600 nm were higher than 3.5%. This means that in the case where the protective layer has a large thickness, it is preferred not to excessively heighten the refractive index of the protective layer.

Example 3-1

Layers of a-Si, $SiO_2$, and $Ta_2O_5$ were deposited on one major surface of a transparent glass substrate by sputtering to form a dielectric multilayer film (S1) in which the total number of laid layers was 13 and which had an overall film thickness of 0.8 μm. Layers of a-Si, $SiO_2$, and $Ta_2O_5$ were deposited on the other major surface of the transparent glass substrate by sputtering to form a dielectric multilayer film (S2) in which the total number of laid layers was 16 and which had an overall film thickness of 1.2 μm.

On the surface of the dielectric multilayer film (S1), Si and Ta were simultaneously vapor-deposited by co-sputtering to form a protective layer including an oxide of Si and Ta and having the refractive index shown in Table 3.

Thus, an optical filter of Example 3-1 was obtained.

Example 3-2 to Example 3-12

Optical filters of Example 3-2 to Example 3-12 were produced under the same conditions as in Example 3-1, except that the proportion of Si to Ta was regulated so as to make the protective layers have the refractive index values shown in Table 3 and that the protective layers were formed so as to have the thickness values shown in Table 3.

The spectral characteristics are shown in the following Table 3.

Example 3-1 to Example 3-12 are inventive examples according to the present invention.

TABLE 3

| | Protective layer: $SiO_2 + Ta_2O_5$ Refractive index (550 nm) | Protective layer: $SiO_2 + Ta_2O_5$ Thickness (nm) | S1-side minimum reflectance R800-1600 nm, 5 degrees, MIN (%) | S1-side minimum reflectance R800-1600 nm, 60 degrees, MIN (%) | a* (incident angle, 0-60 degrees) | b* (incident angle, 0-60 degrees) | Δa* × Δb* | Average transmittance T400-680 nm, 0 degrees, AVE (%) |
|---|---|---|---|---|---|---|---|---|
| Ex. 3-1 | 1.56 | 30 | 0.02 | 1.61 | −3.08 ≤ a* ≤ −0.12 | −2.26 ≤ b* ≤ −0.32 | 5.7 | 0.06 |
| Ex. 3-2 | 1.71 | 30 | 0.02 | 1.68 | −2.78 ≤ a* ≤ −0.34 | −1.89 ≤ b* ≤ −0.22 | 4.1 | 0.06 |
| Ex. 3-3 | 2.01 | 30 | 0.03 | 2.13 | −2.15 ≤ a* ≤ −0.98 | −0.83 ≤ b* ≤ −0.07 | 0.9 | 0.06 |
| Ex. 3-4 | 2.15 | 30 | 0.05 | 2.46 | −2.22 ≤ a* ≤ −0.96 | −0.98 ≤ b* ≤ −0.11 | 1.1 | 0.06 |
| Ex. 3-5 | 1.56 | 80 | 0.02 | 1.78 | −2.37 ≤ a* ≤ −0.35 | −1.85 ≤ b* ≤ −0.31 | 3.1 | 0.06 |
| Ex. 3-6 | 1.71 | 80 | 0.04 | 2.53 | −1.74 ≤ a* ≤ −0.89 | −1.11 ≤ b* ≤ −0.17 | 0.8 | 0.06 |
| Ex. 3-7 | 2.01 | 80 | 0.14 | 5.06 | −2.63 ≤ a* ≤ 0.2 | −1.84 ≤ b* ≤ 0.35 | 6.2 | 0.05 |
| Ex. 3-8 | 2.15 | 80 | 0.20 | 5.44 | −4.91 ≤ a* ≤ 0.05 | −2.41 ≤ b* ≤ 2.06 | 22.1 | 0.05 |
| Ex. 3-9 | 1.56 | 129 | 0.02 | 1.95 | −1.99 ≤ a* ≤ −0.61 | −1.41 ≤ b* ≤ −0.24 | 1.6 | 0.06 |
| Ex. 3-10 | 1.71 | 116 | 0.06 | 3.02 | −1.69 ≤ a* ≤ −0.7 | −1.25 ≤ b* ≤ −0.15 | 1.1 | 0.06 |
| Ex. 3-11 | 2.01 | 104 | 0.17 | 5.63 | −3.72 ≤ a* ≤ 0.36 | −2.36 ≤ b* ≤ 1.27 | 14.8 | 0.05 |
| Ex. 3-12 | 2.15 | 132 | 0.21 | 5.79 | −7.03 ≤ a* ≤ 0.48 | −2.66 ≤ b* ≤ 3.14 | 43.6 | 0.05 |

The results given in Table 3 show that optical filters having excellent spectral characteristics were obtained. It can be further seen that since a* and b* were within the range of 10 to +10, the obtained optical filters had excellent appearance attractiveness. In Examples 3-7, 3-8, 3-11, and 3-12, the minimum reflectances at an incident angle of 60° within the wavelength range of 800-1,600 nm were higher than 3.5%. This means that in the case where the protective layer has a large thickness, it is preferred not to excessively heighten the refractive index of the protective layer.

Example 4-1

Layers of a-Si, $SiO_2$, and $Ta_2O_5$ were deposited on one major surface of a transparent glass substrate by sputtering to form a dielectric multilayer film (S1) in which the total number of laid layers was 32 and which had an overall film thickness of 2.3 μm. Layers of a-Si, $SiO_2$, and $Ta_2O_5$ were deposited on the other major surface of the transparent glass substrate by sputtering to form a dielectric multilayer film (S2) in which the total number of laid layers was 23 and which had an overall film thickness of 2.1 m.

On the surface of the dielectric multilayer film (S1), Si and Ta were simultaneously vapor-deposited by co-sputtering to form a protective layer including an oxide of Si and Ta and having the refractive index shown in Table 4.

Thus, an optical filter of Example 4-1 was obtained.

Example 4-2 to Example 4-10

Optical filters of Example 4-2 to Example 4-10 were produced under the same conditions as in Example 4-1, except that the proportion of Si to Ta was regulated so as to make the protective layers have the refractive index values shown in Table 4 and that the protective layers were formed so as to have the thickness values shown in Table 4.

The spectral characteristics are shown in the following Table 4.

Example 4-1 to Example 4-10 are inventive examples according to the present invention.

TABLE 4

| | Protective layer: $SiO_2 + Ta_2O_5$ Refractive index (550 nm) | Protective layer: $SiO_2 + Ta_2O_5$ Thickness (nm) | S1-side minimum reflectance R800-1600 nm, 5 degrees, MIN (%) | S1-side minimum reflectance R800-1600 nm, 60 degrees, MIN (%) |
|---|---|---|---|---|
| Ex. 4-1 | 1.56 | 30 | 0.01 | 0.93 |
| Ex. 4-2 | 1.71 | 30 | 0.01 | 1.04 |

TABLE 4-continued

| | | | | |
|---|---|---|---|---|
| Ex. 4-3 | 2.01 | 30 | 0.02 | 1.25 |
| Ex. 4-4 | 2.15 | 30 | 0.02 | 1.36 |
| Ex. 4-5 | 1.56 | 80 | 0.01 | 1.05 |
| Ex. 4-6 | 1.71 | 80 | 0.02 | 1.39 |
| Ex. 4-7 | 1.56 | 111 | 0.02 | 1.14 |
| Ex. 4-8 | 1.71 | 96 | 0.03 | 1.43 |
| Ex. 4-9 | 2.01 | 58 | 0.03 | 1.98 |
| Ex. 4-10 | 2.15 | 56 | 0.04 | 2.21 |

| | a* (incident angle, 0-60 degrees) | b* (incident angle, 0-60 degrees) | Δa* × Δb* | Average transmittance T400-680 nm, 0 degrees, AVE (%) |
|---|---|---|---|---|
| Ex. 4-1 | −4.67 ≤ a* ≤ −2.41 | −1.64 ≤ b* ≤ 0.54 | 4.9 | 0.15 |
| Ex. 4-2 | −4.52 ≤ a* ≤ −2.35 | −1.53 ≤ b* ≤ 0.63 | 4.7 | 0.15 |
| Ex. 4-3 | −4.46 ≤ a* ≤ −2.34 | −0.98 ≤ b* ≤ 0.64 | 3.4 | 0.22 |
| Ex. 4-4 | −4.9 ≤ a* ≤ −2.52 | −0.73 ≤ b* ≤ 0.44 | 2.8 | 0.33 |
| Ex. 4-5 | −4.36 ≤ a* ≤ −2.25 | −1.28 ≤ b* ≤ 0.59 | 3.9 | 0.19 |
| Ex. 4-6 | −5.05 ≤ a* ≤ −2.24 | −0.81 ≤ b* ≤ 0.65 | 4.1 | 0.18 |
| Ex. 4-7 | −4.36 ≤ a* ≤ −2.08 | −1.24 ≤ b* ≤ 0.65 | 4.3 | 0.19 |
| Ex. 4-8 | −5.74 ≤ a* ≤ −2.17 | −0.74 ≤ b* ≤ 0.72 | 5.2 | 0.25 |
| Ex. 4-9 | −3.06 ≤ a* ≤ −1.46 | −0.99 ≤ b* ≤ 0.03 | 1.6 | 0.19 |
| Ex. 4-10 | −2.64 ≤ a* ≤ −1.56 | −1.04 ≤ b* ≤ −0.11 | 1.0 | 0.21 |

The results given in Table 4 show that optical filters having excellent spectral characteristics were obtained. It can be further seen that since a* and b* were within the range of −10 to +10, the obtained optical filters had excellent appearance attractiveness.

Example 5-1

Layers of a-Si, $SiO_2$, and $Nb_2O_5$ were deposited on one major surface of a transparent glass substrate by sputtering to form a dielectric multilayer film (S1) in which the total number of laid layers was 29 and which had an overall film thickness of 1.6 μm. Layers of a-Si, $SiO_2$, and $Nb_2O_5$ were deposited on the other major surface of the transparent glass substrate by sputtering to form a dielectric multilayer film (S2) in which the total number of laid layers was 17 and which had an overall film thickness of 2.2 m.

On the surface of the dielectric multilayer film (S1), Si and Nb were simultaneously vapor-deposited by co-sputtering to form a protective layer including an oxide of Si and Nb and having the refractive index shown in Table 5.

Thus, an optical filter of Example 5-1 was obtained.

Example 5-2 to Example 5-15

Optical filters of Example 5-2 to Example 5-15 were produced under the same conditions as in Example 5-1, except that the proportion of Si to Nb was regulated so as to make the protective layers have the refractive index values shown in Table 5 and that the protective layers were formed so as to have the thickness values shown in Table 5.

The spectral characteristics are shown in the following Table 5.

Example 5-1 to Example 5-15 are inventive examples according to the present invention.

TABLE 5

| | Protective layer: $SiO_2$ + $Ta_2O_5$ | | S1-side minimum reflectance | S1-side minimum reflectance |
|---|---|---|---|---|
| | Refractive index (550 nm) | Thickness (nm) | R800-1600 nm, 5 degrees, MIN (%) | R800-1600 nm, 60 degrees, MIN (%) |
| Ex. 5-1 | 1.54 | 30 | 0.01 | 1.14 |
| Ex. 5-2 | 1.65 | 30 | 0.01 | 1.16 |
| Ex. 5-3 | 1.80 | 30 | 0.01 | 1.18 |
| Ex. 5-4 | 2.04 | 30 | 0.02 | 1.20 |
| Ex. 5-5 | 2.35 | 30 | 0.03 | 1.26 |
| Ex. 5-6 | 1.54 | 80 | 0.02 | 1.17 |
| Ex. 5-7 | 1.65 | 80 | 0.03 | 1.21 |
| Ex. 5-8 | 1.80 | 80 | 0.10 | 1.38 |
| Ex. 5-9 | 2.04 | 80 | 0.01 | 1.68 |
| Ex. 5-10 | 2.35 | 80 | 0.03 | 1.84 |
| Ex. 5-11 | 1.54 | 228 | 0.06 | 1.34 |
| Ex. 5-12 | 1.65 | 219 | 0.06 | 1.74 |
| Ex. 5-13 | 1.80 | 170 | 0.01 | 1.84 |
| Ex. 5-14 | 2.04 | 100 | 0.02 | 1.66 |
| Ex. 5-15 | 2.35 | 105 | 0.01 | 2.12 |

TABLE 5-continued

| | a* (incident angle, 0-60 degrees) | b* (incident angle, 0-60 degrees) | Δa* × Δb* | Average transmittance T400-680 nm, 0 degrees, AVE (%) |
|---|---|---|---|---|
| Ex. 5-1 | −1.4 ≤ a* ≤ 0.11 | −0.5 ≤ b* ≤ 0.77 | 1.9 | 0.01 |
| Ex. 5-2 | −2.08 ≤ a* ≤ 0.25 | −0.52 ≤ b* ≤ 0.3 | 1.9 | 0.01 |
| Ex. 5-3 | −2.87 ≤ a* ≤ 0.51 | −0.39 ≤ b* ≤ 0.34 | 2.5 | 0.01 |
| Ex. 5-4 | −3.59 ≤ a* ≤ 1.16 | −0.11 ≤ b* ≤ 0.59 | 3.3 | 0.01 |
| Ex. 5-5 | −4.68 ≤ a* ≤ 0.21 | −0.1 ≤ b* ≤ 0.91 | 4.9 | 0.01 |
| Ex. 5-6 | −2.37 ≤ a* ≤ 0.4 | −0.47 ≤ b* ≤ 0.89 | 3.8 | 0.01 |
| Ex. 5-7 | −3.12 ≤ a* ≤ 0.61 | −0.55 ≤ b* ≤ 0.66 | 4.5 | 0.01 |
| Ex. 5-8 | −5.32 ≤ a* ≤ 1.26 | −0.84 ≤ b* ≤ 1.67 | 16.5 | 0.01 |
| Ex. 5-9 | 0.66 ≤ a* ≤ 2.38 | −1.91 ≤ b* ≤ 1.68 | 6.2 | 0.01 |
| Ex. 5-10 | −9.54 ≤ a* ≤ 1.58 | 1.05 ≤ b* ≤ 5.28 | 47.1 | 0.01 |
| Ex. 5-11 | −5.47 ≤ a* ≤ 0.75 | −0.48 ≤ b* ≤ 1.37 | 11.5 | 0.01 |
| Ex. 5-12 | −3.94 ≤ a* ≤ 0.17 | −0.07 ≤ b* ≤ 0.89 | 3.9 | 0.01 |
| Ex. 5-13 | −1.5 ≤ a* ≤ 2.01 | −1.36 ≤ b* ≤ 0.95 | 8.1 | 0.01 |
| Ex. 5-14 | −0.07 ≤ a* ≤ 3.01 | −2.7 ≤ b* ≤ 2.32 | 15.4 | 0.01 |
| Ex. 5-15 | −3.88 ≤ a* ≤ 3.36 | −2.23 ≤ b* ≤ 3.24 | 39.6 | 0.01 |

The results given in Table 5 show that optical filters having excellent spectral characteristics were obtained. It can be further seen that since a* and b* were within the range of −10 to +10, the obtained optical filters had excellent appearance attractiveness. In Examples 5-10 and 5-15, the values of Δa*×Δb* were large. This means that in the case where the protective layer has a large thickness, it is preferred not to excessively heighten the refractive index of the protective layer.

INDUSTRIAL APPLICABILITY

The optical filter of the present invention is excellent in terms of the property of transmitting near infrared light and the property of blocking visible light and is hence useful in applications of information-acquiring devices, e.g., cameras and sensors for transporting machines, of which the performances are being advanced nowadays.

REFERENCE SIGNS LIST

1A, 1B: Optical filter
10: Substrate
20: Protective layer
S1: Dielectric multilayer film
S2: Dielectric multilayer film

What is claimed is:

1. An optical filter comprising:

a substrate;

a dielectric multilayer film laid on or above at least one major surface of the substrate; and a protective layer laid on or above the dielectric multilayer film, wherein the dielectric multilayer film comprises a layer made of amorphous silicon and a layer differing in refractive index from the layer made of amorphous silicon, the protective layer comprises a mixed film, the mixed film comprises silica, and an oxide of at least one metal selected from among tantalum, niobium, zirconium, titanium, hafnium, tungsten, tin, cerium, chromium, nickel, and vanadium, the optical filter is configured to transmit near infrared light, and in the protective layer, a proportion represented by (M1/(M1+M2))×100% is 2.0% or higher, where M1 is a number of metal atoms in the protective layer of the at least one metal selected from among tantalum, niobium, zirconium, titanium, hafnium, tungsten, tin, cerium, chromium, nickel, and vanadium, and M2 is a number of atoms of silicon in the protective layer.

2. The optical filter of claim 1, wherein the oxide of the mixed film is niobium pentoxide, and the protective layer comprising the mixed film has a refractive index at a wavelength of 550 nm of 1.49 to 2.20.

3. The optical filter of claim 1, wherein, in the protective layer, the oxide is niobium pentoxide and a proportion represented by $(M1_{Nb}/(M1_{Nb}+M2))\times100\%$ is 4.0% to 45.0%, $M1_{Nb}$ is a number of atoms of niobium in the protective layer, and M2 is a number of atoms of silicon in the protective layer.

4. The optical filter of claim 1, satisfying all of the following spectral characteristics (i-1) to (i-4):

(i-1) a minimum reflectance $R_{800\text{-}1600(5)MIN}$ is 1.0% or less at an incident angle of 5 degrees within a wavelength range of 800 nm to 1,600 nm;

(i-2) a minimum reflectance $R_{800\text{-}1600(60)MIN}$ is 3.5% or less at an incident angle of 60 degrees within the wavelength range of 800 nm to 1,600 nm;

(i-3) an average transmittance $T_{400\text{-}680(0)AVE}$ is 5.0% or less at an incident angle of 0 degrees within a wavelength range of 400 nm to 680 nm; and (i-4) a surface of the protective layer has a color satisfying −10≤a*≤+10 and −10≤b*≤+10 in an incident angle of 0 degrees to 60 degrees under D65 light source, wherein a* is a first color index coordinate and b* is a second color index coordinate for color index L*a*b* based on JIS Z 8781-4:2013.

5. A cover for a LiDAR sensor, comprising the optical filter of claim 1.

* * * * *